E. D. LEWALLEN.
HAY RAKE.
APPLICATION FILED DEC. 22, 1910.

992,889.

Patented May 23, 1911.
3 SHEETS—SHEET 3.

Witnesses
F. C. Barry
A. R. Walton.

Inventor
Edward D. Lewallen
by
Attorneys

UNITED STATES PATENT OFFICE.

EDWARD D. LEWALLEN, OF HUCKABAY, TEXAS.

HAY-RAKE.

992,889.  Specification of Letters Patent.  Patented May 23, 1911.

Application filed December 22, 1910. Serial No. 598,716.

*To all whom it may concern:*

Be it known that I, EDWARD D. LEWALLEN, citizen of the United States, residing at Huckabay, in the county of Erath and State of Texas, have invented certain new and useful Improvements in Hay-Rakes, of which the following is a specification.

This invention relates to that class of horse hay-rakes in which the rake proper is located in front of the horses, said rakes being commonly known as push or buck rakes.

It is the object of the present invention to provide in a rake of the kind stated a novel form of rake head having hinged end sections which may be folded so as to extend vertically, whereby the rake head is shortened, and thus enabled to pass through gates or other narrow places. The end sections in vertical position also form guards to prevent the hay from falling off when it is desired to carry the load a considerable distance.

The invention also has for its object to provide a rake which can be easily handled by the driver, and which is efficient in operation, and simple and durable in construction.

With these and other objects in view, as will appear when the nature of the invention is better understood, the same consists in a novel construction and arrangement of parts to be hereinafter described and claimed.

The preferred embodiment of the invention has been shown, but it will be understood that various changes in the structural details, falling within the scope of the appended claim, may be resorted to.

In order that the invention may be better understood, reference is had to the accompanying drawings, forming a part of this specification, in which drawings—

Figure 1:
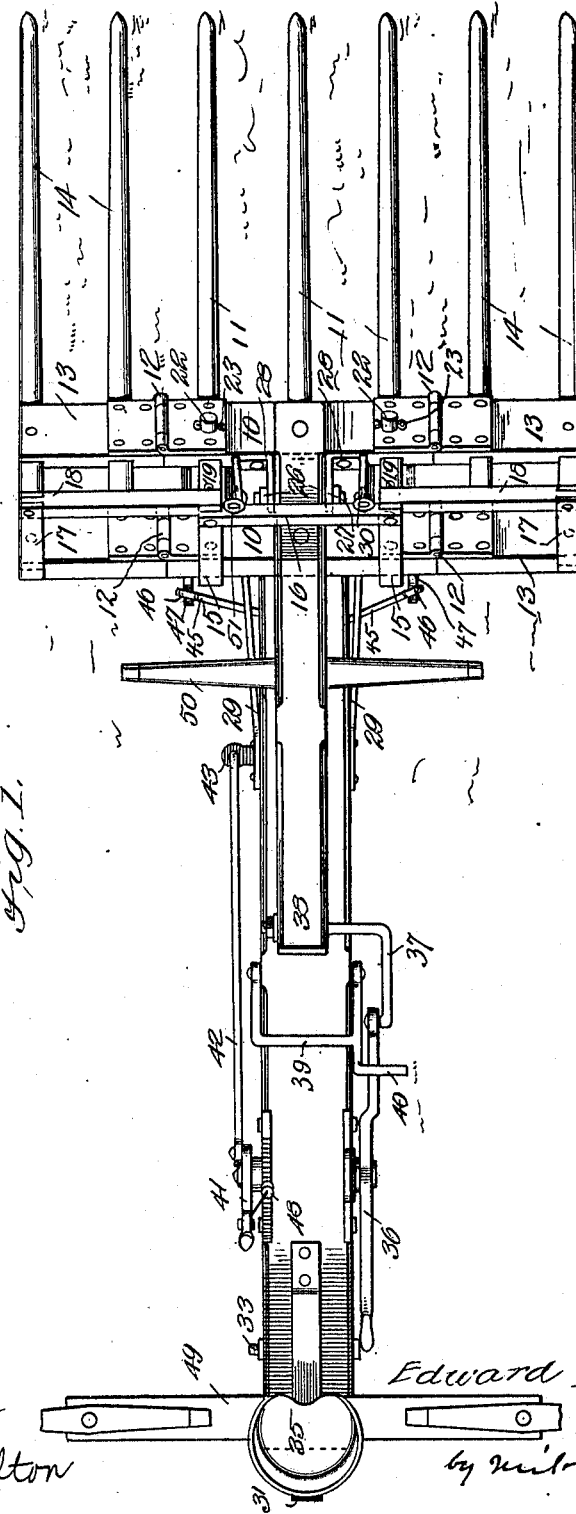
Figure 2:
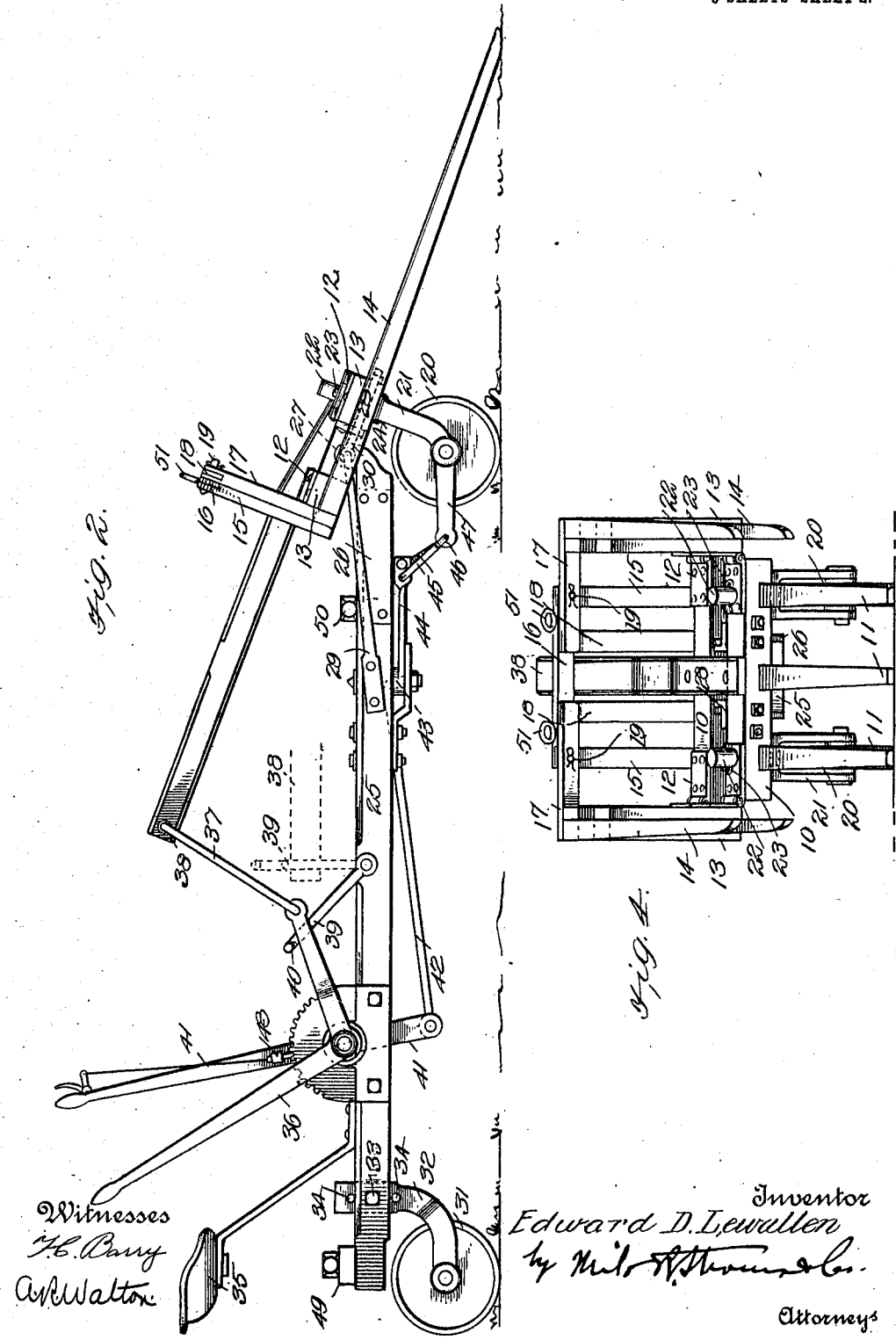
Figure 3:
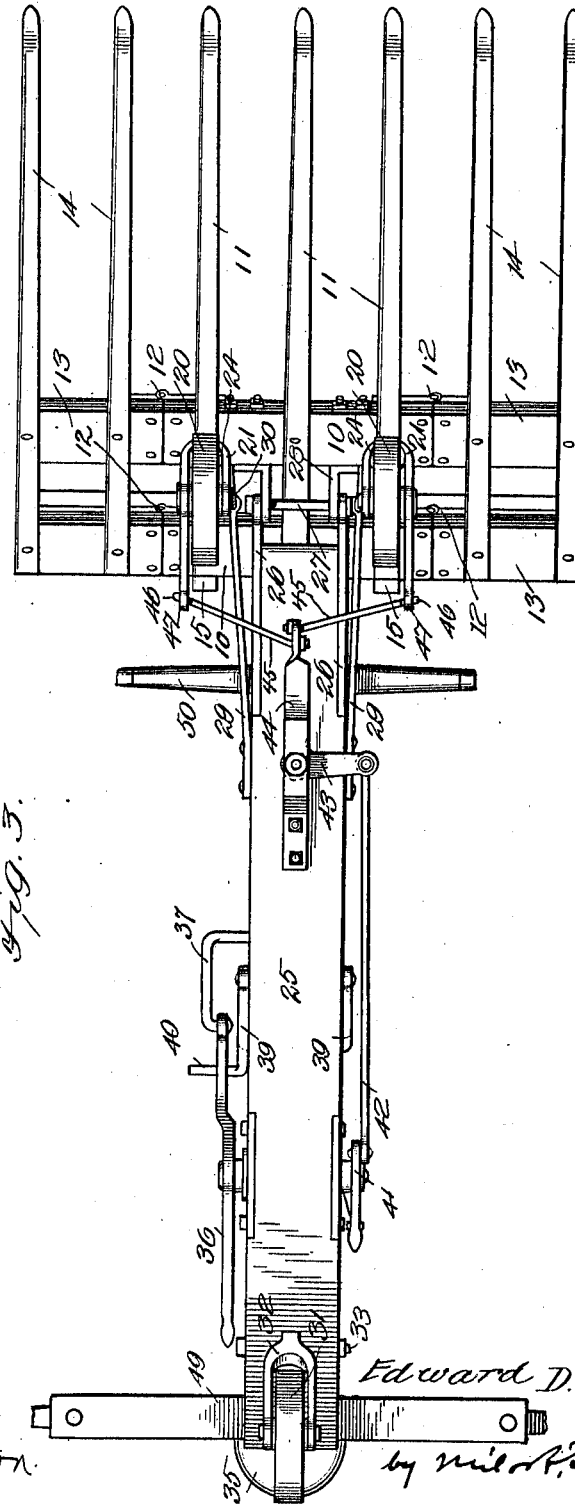

Figure 1 is a top plan view of the rake. Fig. 2 is a side elevation. Fig. 3 is a bottom plan view. Fig. 4 is a front elevation showing the hinged end sections of the rake head swung into vertical position.

Referring specifically to the drawings, the rake head comprises a pair of parallel bars 10 to which the rake teeth 11 are secured, said rake teeth projecting forwardly from the bars, and the latter being mortised on the bottom to receive the butt ends of the teeth. Bolts or other suitable means are provided for securely fastening the teeth to the cross bars. At the ends of the cross bars are connected, by means of hinges 12, short bars 13 which form continuations of the cross bars, and also carry rake teeth 14. The hinged connection between the bars 10 and 13 is such that the latter may be swung upwardly into vertical position, as shown in Fig. 4 of the drawings, in which position the rake head is shortened, and is thus enabled to pass through gates and other narrow places, and at the same time the teeth 14 form guards at the ends of the rake, and prevent the hay from dropping off, thus enabling the load to be carried a considerable distance without scattering the same over the field. When the rake is in operation, the bars 13 are to be swung downwardly, so as to extend in line with the bars 10, and in this position the teeth 14 are also in line with the teeth 11, and coöperate with the latter to gather the hay.

To the rear cross bar 10 are secured posts 15 which are connected at the top by a cross bar 16. To each rear bar 13 is secured a post 17. To the top of each post 17 is secured a bar 18 which, when the bars 13 are in horizontal or working position, is in alinement with the bar 16. The inner ends of the bars 18 overlap the upper ends of the posts 15, and by means of pins 19 passing through said overlapping parts, the end sections of the rake formed by the bars 13 and the teeth 14, are securely held in horizontal or working position. Before these end sections of the rake can be swung into vertical or carrying position, it will be necessary to remove the pins 19. The posts 15 and 17, and the bars 16 and 18 also form guards for the rear of the rake head to prevent the hay from dropping over the same. The pins 19 also serve to hold the hinged sections of the rake head in vertical position by being removed from the openings in the posts 15 and bars 18 and passed through openings in the posts 17 and 15, as shown in Fig. 4.

The rake head is mounted on wheels 20, the axles of which are carried by forks 21 having shanks 22 which are swiveled to the front cross bar 10 by extending loosely through an opening therein. In line with these openings, apertures are made in one of the leaves of the hinges 12, through which apertures the shanks also pass. The shanks project a short distance above the hinge leaves, and their projecting ends carry transverse pins 23 engageable with said hinge leaves, to prevent the shanks from dropping downwardly out of the openings. The bottom of the cross bar 10 is engageable by shoulders 24 on the shanks.

The herein described swivel supports of the wheels 20 are provided in order that said wheels may be shifted to steer the machine. The rake head is carried at the front end of a push bar 25, to which bar it is hinged so that it may be swung in a vertical plane to raise and lower the rake teeth. To opposite sides of the push bar, at its front end, are secured plates 26 which project a short distance from the front end of said bar, and carry, at said projecting ends, a cross pin 27. To the rear side of the front cross bar 10 are secured angle brackets 28 having their rearwardly outstanding portions connected to the plates 26 by means of the pin 27, said outstanding portions of the brackets having perforations to receive the pin. By means of this connection between the bar 25 and the rake head, the latter is pivotally supported, so that it may be raised or lowered to place the rake teeth into carrying or gathering position. The parts are also braced by diagonal rods 29 connected at their ends to the sides of the bar 25 and to the front cross bar 10, respectively, the latter connection being made by means of eye-bolts 30 to which the rods are loosely connected, and this connection being also in line with the hinge axis of the rake head, so that said rake head may be adjusted as already described.

The bar 25 is supported at its rear end by a caster wheel 31, the supporting shank 32 of which extends loosely through a vertical opening made in said bar, and being vertically adjustable so that the bar may be raised or lowered to suit the pitch or inclination of the rake teeth, the shank being held in adjusted position by means of a transverse pin 33 passing through the bar and through a selected one of a series of openings 34 in the shank 32. The rear end of the bar 25 also carries the driver's seat 35.

To one side of the bar 25, in front of the driver's seat, is fulcrumed a hand lever 36 which is connected by a link 37 to the rear end of a beam 38 connected to, and extending rearwardly from, the rake head, whereby the latter may be swung on its pivot. The bar 25 also carries a pivoted yoke 39 which is so located that it may be slipped over the rear end of the beam 38 when the latter is lowered to elevate the rake head, and thus lock the rake head in elevated position. The yoke has an extension 40 on one side so that it may be manipulated by the driver's foot to lock or release the beam.

The mechanism for shifting the steering wheels 20 comprises a hand lever 41 which is pivoted to the bar 25, and is connected at its lower end by means of a rod 42 to one arm 43 of a bell-crank lever fulcrumed on the bottom of the bar 25. To the other arm 44 of the bell-crank lever are connected oppositely extending rods 45, one of which rods is connected by means of an eye-bolt 46, to an arm 47 extending from the fork 21 to one of the wheels 20. The other rod 45 is connected in a similar manner to the fork on the other steering wheel. The hand lever 41 is provided with an ordinary spring latch 48 for locking it to hold the steering wheels in the position to which they may have been swung. It will be seen that the bell-crank lever is swung on its pivot when the hand lever 41 is actuated, and through the connection between said bell-crank lever and the forks of the respective steering wheels, the latter are turned to a steering position.

Two horses will be employed to operate the machine, one horse being located on one side of the bar 25, and the other horse on the other side thereof. The horses therefore walk behind the rake head and push the latter forwardly when the machine is in operation. A double-tree 49 for the team is carried by the bar 25 at its rear end. The bar 25 supports a neck-yoke 50 by which the machine is backed away from the hay by the team. The bar 16 carries eyes 51 to which the horses are to be tied, thus aiding the driver in guiding the machine. By thus connecting the horses to the machine, they can walk in a regular, natural way, and it does not take too much of the driver's time in controlling them, and it is also possible to back from the hay by manipulating the team in the ordinary way.

I claim:

In a hay rake, a rake head comprising a main section and end sections hinged thereto to fold into vertical position, posts rising from the rear ends of the main and end sections, cross bars connected to the posts of the respective sections, the cross bar of the end sections engaging the posts of the main section when the end sections are in alinement with said main section, and said cross bars and posts having registering openings, and removable fastening means passing through said openings, the posts of the end sections also having openings which register with the openings of the posts of the main section when the end sections are in folded position, and said last-mentioned openings being adapted to receive the fastening means.

In testimony whereof I affix my signature in presence of two witnesses.

EDWARD D. LEWALLEN.

Witnesses:
J. J. BENNETT,
JNO. W. FREY.